United States Patent
Aoki

(10) Patent No.: US 9,302,754 B2
(45) Date of Patent: Apr. 5, 2016

(54) VEHICLE CONTROL DEVICE FOR AMPHIBIOUS VEHICLE

(71) Applicant: MITSUBISHI HEAVY INDUSTRIES, LTD., Tokyo (JP)

(72) Inventor: Yasumichi Aoki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/422,561

(22) PCT Filed: Nov. 7, 2013

(86) PCT No.: PCT/JP2013/080071
§ 371 (c)(1),
(2) Date: Feb. 19, 2015

(87) PCT Pub. No.: WO2014/073588
PCT Pub. Date: May 15, 2014

(65) Prior Publication Data
US 2015/0239542 A1  Aug. 27, 2015

(30) Foreign Application Priority Data
Nov. 9, 2012  (JP) ................................. 2012-247183

(51) Int. Cl.
B63H 19/08 (2006.01)
B63H 11/107 (2006.01)
B60F 3/00 (2006.01)

(52) U.S. Cl.
CPC ............... *B63H 11/107* (2013.01); *B60F 3/00* (2013.01); *B60F 3/0015* (2013.01); *B63H 19/08* (2013.01)

(58) Field of Classification Search
USPC .................................. 440/12.5, 12.51, 38, 1
IPC ........... B60F 3/00,3/0015; B63H 19/08, 11/107
See application file for complete search history.

(56) References Cited

U.S. PATENT DOCUMENTS 5,507,672 A * 4/1996 Imaeda ............................. 440/1
2005/0239351 A1  10/2005 Darby et al.

FOREIGN PATENT DOCUMENTS

JP  4-39991 U  4/1992
JP  2006-525918 A  11/2006
(Continued)

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2013/080071, dated May 21, 2015.
International Search Report and Written Opinion of the International Searching Authority (Forms PCT/ISA/210, PCT/ISA/220 and PCT/ISA/237) for International Application No. PCT/JP2013/080071, dated Feb. 10, 2014, with an English translation of the International Search Report only.

*Primary Examiner* — Stephen Avila
(74) *Attorney, Agent, or Firm* — Birch, Stewart, Kolasch & Birch, LLP

(57) ABSTRACT

Provided is a vehicle control device for an amphibious vehicle that can travel with a stable orientation even when the edge of the water consists of uneven terrain or terrain having an inclined surface along a different direction than the direction of travel. A vehicle control device for an amphibious vehicle capable of traveling on land, navigating on the water, and traveling on the edge of the water comprises a jet direction adjuster (15) for adjusting the direction of a jet created by a propeller (11), an orientation detector (31) for detecting the orientation of an amphibious vehicle (1), and a control device (30) for controlling the jet direction adjuster (15) and/or the propeller (11) on the basis of the orientation of the amphibious vehicle (1) detected by the orientation detector (31) when an edge-of-water travel mode is selected.

6 Claims, 9 Drawing Sheets

(56) References Cited

FOREIGN PATENT DOCUMENTS

| JP | 2009-262598 | * | 11/2009 |
| JP | 2010-215066 A | | 9/2010 |
| JP | 2010-269764 A | | 12/2010 |
| JP | 2012-171363 | * | 9/2012 |

* cited by examiner

VEHICLE CONTROL DEVICE FOR AMPHIBIOUS VEHICLE

TECHNICAL FIELD

The present invention relates to a vehicle control device for an amphibious vehicle, or more specifically, to a vehicle control device for an amphibious vehicle which can stabilize behavior or motion of an amphibious vehicle on an edge of water.

BACKGROUND ART

An amphibious vehicle is capable of traveling in three modes, namely, an on-land travel mode of traveling on land by using crawler tracks equipped on the amphibious vehicle, an on-water navigation mode of navigating on top of water by using a propulsion device equipped on the amphibious vehicle, and an on-edge-of-water travel (landing) mode of traveling on an edge of the water from the top of the water toward the land by using both the crawler tracks and the propulsion device.

The travel in the on-edge-of-water travel mode will be described in detail. As shown in FIG. 8, when a bottom 102 on an edge 101 of the water is composed of a terrain including an inclined surface 102a that extends in a traveling direction A11 of an amphibious vehicle 200, a vehicle control device (not shown) for the amphibious vehicle 200 drives crawler tracks 22 equipped on the amphibious vehicle 200 by rotation of sprockets 21 equipped on the amphibious vehicle 200, and creates a jet straight backward from the amphibious vehicle 200 by drive of a propulsion device (not shown) equipped on the amphibious vehicle 200. Thus, the amphibious vehicle 200 travels on the inclined surface 102a at the bottom 102 on the edge 101 of the water toward the land.

PRIOR ART DOCUMENT

Patent Document

Patent Document 1: Japanese Patent Application Publication No. 2010-215066

SUMMARY OF THE INVENTION

Problems to be Solved by the Invention

In the meantime, when the above-described amphibious vehicle travels in the on-edge-of-water travel mode, it is likely that the amphibious vehicle cannot travel with a stable orientation depending on the terrain at the bottom on the edge of the water, and there are limitations of terrains on which the amphibious vehicle can travel.

For example, when a bottom 103 on the edge 101 of the water is composed of a terrain including a terrace 103a against a traveling direction A12 of the amphibious vehicle 200 as shown in FIG. 9A, it is likely that the amphibious vehicle 200 cannot retain a stable orientation even if the vehicle control device controls the sprockets 21 and the propulsion device, and thereby drives the crawler tracks 22 by the rotation of the sprockets 21 and creates the jet straight backward from the amphibious vehicle 200 by the drive of the propulsion device. Hence, it is likely that the amphibious vehicle 200 cannot climb up the terrace 103a completely as a rear part 200b side thereof tilts in a direction of an arrow B11.

Meanwhile, when a bottom 104 on the edge 101 of the water is composed of a terrain including an inclined surface 104a extending in a direction different from a traveling direction A13 of the amphibious vehicle 200 as shown in FIG. 9B, it is likely that the amphibious vehicle 200 cannot retain a stable orientation even if the vehicle control device controls the sprockets and the propulsion device, and thereby drives the crawler tracks by the rotation of the sprockets and creates the jet straight backward from the amphibious vehicle 200 by the drive of the propulsion device. Hence, it is likely that the amphibious vehicle 200 cannot climb up the inclined surface 104a completely as a lateral part 200c side thereof tilts in a direction of an arrow B12.

Although the above-mentioned Patent Document 1 describes a vehicle motion control system which can stabilize behavior or motion of a vehicle, Patent Document 1 does not describe a vehicle control device for an amphibious vehicle which can stabilize behavior or motion of a vehicle when the vehicle travels on the edge of the water.

In view of the above, the present invention has been made to solve the above-described problems, and an object thereof is to provide a vehicle control device for an amphibious vehicle, which enables the amphibious vehicle to travel with a stable orientation even when a bottom on an edge of water is composed of a terrain including a terrace or a terrain including an inclined surface that extends in a direction different from a traveling direction.

Means for Solving the Problems

A first aspect of a vehicle control device for an amphibious vehicle to solve the above-mentioned problems is a vehicle control device for an amphibious vehicle capable of performing on-land travel of traveling on land using crawler tracks by transmitting an output from a drive device to the crawler tracks when an on-land travel mode is selected, on-water navigation of navigating on top of water using a jet created by a propulsion device by transmitting the output from the drive device to the propulsion device when an on-water navigation mode is selected, and on-edge-of-water travel of traveling on an edge of the water using the crawler tracks and the propulsion device by transmitting the output from the drive device to the crawler tracks and the propulsion device when an on-edge-of-water travel mode is selected, characterized in that the vehicle control device for an amphibious vehicle comprises: jet direction adjusting means for adjusting a discharging direction of the jet created by the propulsion device; orientation detecting means for detecting an orientation of the amphibious vehicle; and controlling means for controlling at least one of the jet direction adjusting means and the propulsion device on the basis of the orientation of the amphibious vehicle when the on-edge-of-water travel mode is selected.

A second aspect of the vehicle control device for an amphibious vehicle to solve the above-mentioned problems is the vehicle control device for an amphibious vehicle according to the above-described first aspect, characterized in that the orientation detecting means is capable of detecting a pitch angle displacement amount of the amphibious vehicle, and the controlling means controls the jet direction adjusting means such that the discharging direction of the jet created by the propulsion device is directed downward behind the amphibious vehicle when the pitch angle displacement amount detected by the orientation detecting means is equal to or above a set value of a pitch angle component.

A third aspect of the vehicle control device for an amphibious vehicle to solve the above-mentioned problems is the vehicle control device for an amphibious vehicle according to the above-described first aspect, characterized in that the orientation detecting means is capable of detecting a roll angle displacement amount of the amphibious vehicle, the propulsion device is an instrument capable of discharging the jet created by the propulsion device from one position at a rear part of the amphibious vehicle, and the controlling means controls the jet direction adjusting means such that a turning force occurs in the amphibious vehicle when the roll angle displacement amount detected by the orientation detecting means is equal to or above a set value of a roll angle component.

A fourth aspect of the vehicle control device for an amphibious vehicle to solve the above-mentioned problems is the vehicle control device for an amphibious vehicle according to the above-described first aspect, characterized in that the orientation detecting means is capable of detecting a roll angle displacement amount of the amphibious vehicle, the propulsion device is an instrument capable of discharging the jet created by the propulsion device from at least two positions in a right-left direction at a rear part of the amphibious vehicle, and the controlling means controls the propulsion device such that a turning force occurs in the amphibious vehicle when the roll angle displacement amount detected by the orientation detecting means is equal to or above a set value of a roll angle component.

A fifth aspect of the vehicle control device for an amphibious vehicle to solve the above-mentioned problems is the vehicle control device for an amphibious vehicle according to the above-described first aspect, characterized in that the orientation detecting means is capable of detecting a pitch angle displacement amount of the amphibious vehicle and a roll angle displacement amount of the amphibious vehicle, the propulsion device is an instrument capable of discharging the jet created by the propulsion device from one position at a rear part of the amphibious vehicle, and the controlling means controls the jet direction adjusting means such that the discharging direction of the jet created by the propulsion device is directed downward behind the amphibious vehicle when the pitch angle displacement amount detected by the orientation detecting means is equal to or above a set value of a pitch angle component, and controls the jet direction adjusting means such that a turning force occurs in the amphibious vehicle when the roll angle displacement amount detected by the orientation detecting means is equal to or above a set value of a roll angle component.

A sixth aspect of the vehicle control device for an amphibious vehicle to solve the above-mentioned problems is the vehicle control device for an amphibious vehicle according to the above-described first aspect, characterized in that the orientation detecting means is capable of detecting a pitch angle displacement amount of the amphibious vehicle and a roll angle displacement amount of the amphibious vehicle, the propulsion device is an instrument capable of discharging the jet created by the propulsion device from at least two positions in a right-left direction at a rear part of the amphibious vehicle, and the controlling means controls the jet direction adjusting means such that the discharging direction of the jet created by the propulsion device is directed downward behind the amphibious vehicle when the pitch angle displacement amount detected by the orientation detecting means is equal to or above a set value of a pitch angle component, and controls the propulsion device such that a turning force occurs in the amphibious vehicle when the roll angle displacement amount detected by the orientation detecting means is equal to or above a set value of a roll angle component.

Effect of the Invention

According to a vehicle control device for an amphibious vehicle of the present invention, an amphibious vehicle can travel with a stable orientation even when a bottom on an edge of water is composed of a terrain including a terrace or a terrain including an inclined surface that extends in a direction different from a traveling direction.

MODES FOR CARRYING OUT THE INVENTION

Figure 1:
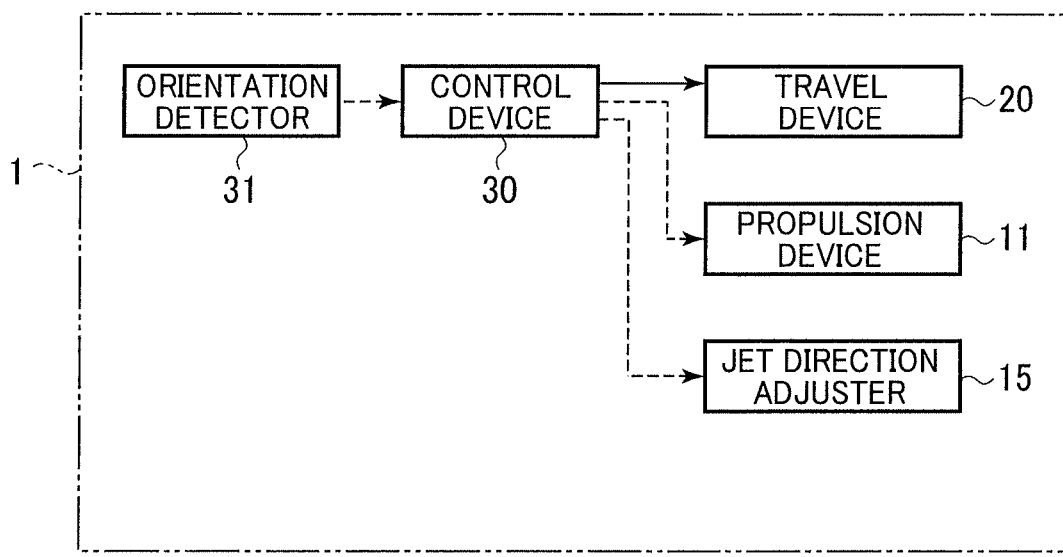
FIG. 1 is a block diagram showing an example of an embodiment of a vehicle control device for an amphibious vehicle according to the present invention.
Figure 2A:
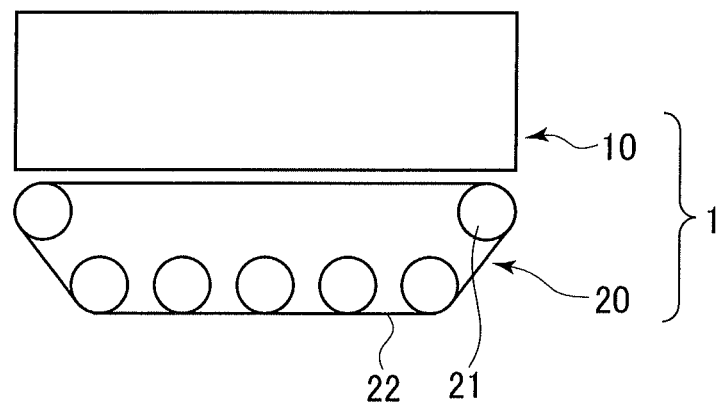
FIG. 2A is a schematic side view showing an example of an amphibious vehicle equipped with the vehicle control device.
Figure 2B:
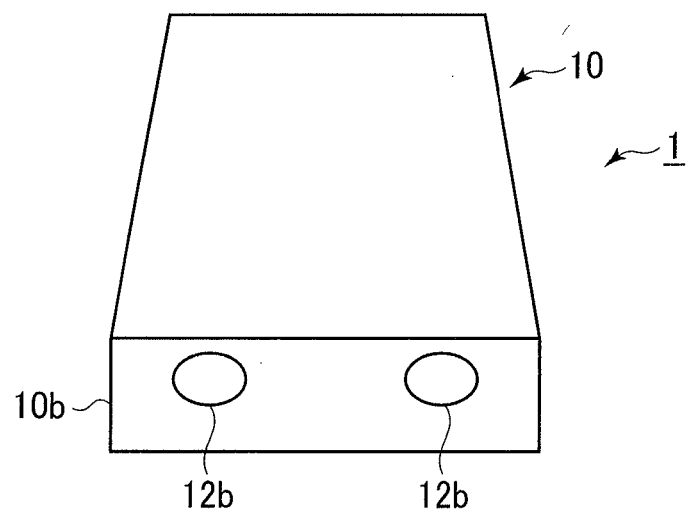
FIG. 2B is a schematic rear view showing the example of the amphibious vehicle equipped with the vehicle control device.

Embodiments of a vehicle control device for an amphibious vehicle according to the present invention will be described on the basis of the drawings. It is to be noted, however, that the present invention is not limited only to the embodiments described below on the basis of the drawings.

First Embodiment

A vehicle control device for an amphibious vehicle according to a first embodiment of the present invention will be described on the basis of FIG. 1 to FIG. 5.

As shown in FIG. 1 to FIG. 3B, an amphibious vehicle 1 includes a travel device 20 provided to a vehicle body 10, and propulsion devices 11 provided to the vehicle body 10. The travel device 20 includes sprockets 21 to be rotated by a drive device (not shown) such as an engine, and includes crawler tracks 22 to be rotated by the sprockets 21.

Each propulsion device 11 includes: propellers 13 which are disposed inside a fluid passage 12 that connects a lower surface part 10c of the vehicle body 10 to the rear part 10b thereof and allows a fluid such as water to flow therethrough; and a propeller shaft 14 which attaches the propellers 13 on its tip end side. The propeller shaft 14 is rotatably provided to the vehicle body 10 with its base end side joined to the drive device. Accordingly, a jet is created as the propellers 13 are rotated by the rotation of the propeller shaft 14, and the jet is discharged to a rear part 1b of the amphibious vehicle 1.

The amphibious vehicle 1 includes a jet direction adjuster 15 which is provided in the vicinity of rear side openings 12b of the fluid passages 12 and configured to adjust a discharging direction of the jet. Thus, the jet direction is adjustable by adjusting a position of the jet direction adjuster 15.

Figure 3A:
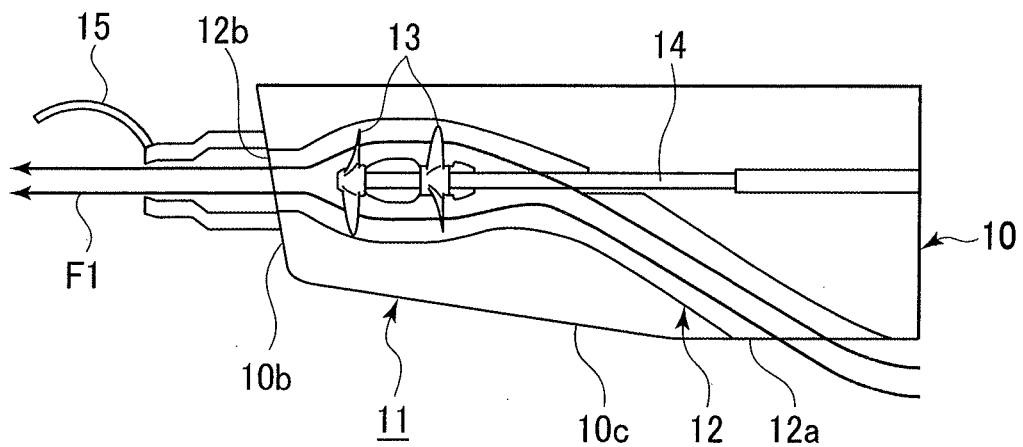
FIG. 3A is an explanatory diagram of the amphibious vehicle, which shows a state where a jet direction from a propulsion device equipped on the amphibious vehicle is not adjusted.
Figure 3B:
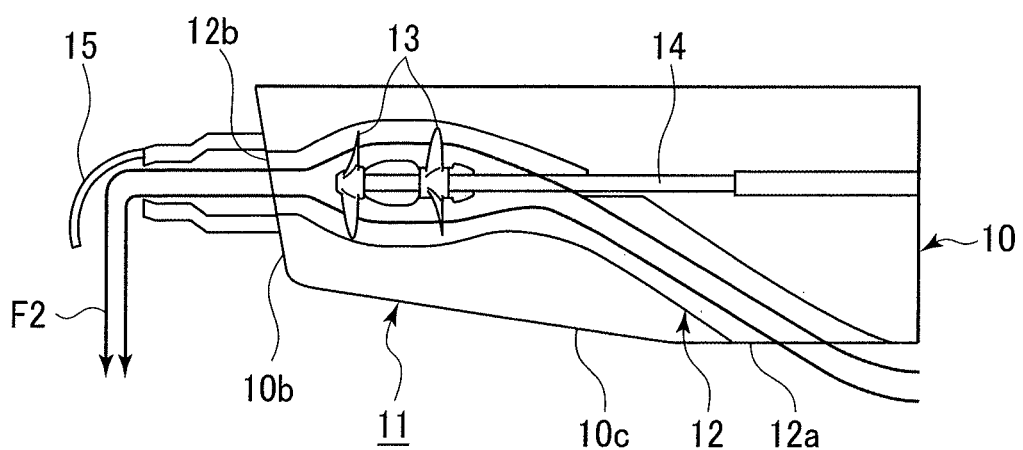
FIG. 3B is an explanatory diagram of the amphibious vehicle, which shows a state where the jet direction from the propulsion device equipped on the amphibious vehicle is adjusted.

For example, as shown in FIG. 3A, when the jet direction adjuster 15 is not controlled, the jet adjuster 15 is located at a position receding from the rear side openings 12b of the fluid passages 12, whereby a jet F1 to be created by each propulsion device 11 is created straight backward from the amphibious vehicle 1. Meanwhile, as shown in FIG. 3B, by controlling the jet direction adjuster 15 such that an opening defined by the jet direction adjuster 15 is located to a lower side, a jet F2 to be created by each propulsion device 11 is created downward behind the amphibious vehicle 1.

In other words, when an on-land travel mode is selected, the amphibious vehicle 1 can travel on land by transmitting an output from the drive device to the sprockets 21 so as to rotate the sprockets 21, and thereby rotating the crawler tracks 22.

When an on-water navigation mode is selected, the amphibious vehicle 1 can navigate on water by: transmitting the output from the drive device to the propeller shafts 14 of the propulsion devices 11 so as to rotate the propeller shafts 14, and thereby rotating the propellers 13 to create the jets; and discharging the jets backward from the amphibious vehicle 1.

When an on-edge-of-water travel mode is selected, the amphibious vehicle 1 can travel on the edge of the water (make a landing) by: transmitting the output from the drive device to the sprockets 21 and the propulsion devices 11; and rotating the sprockets 21 so as to rotate the crawler tracks 22, and meanwhile, rotating the propulsion devices 11 so as to create the jets.

The amphibious vehicle 1 includes an orientation detector 31 configured to detect an orientation (such as a roll angle and a pitch angle) of the amphibious vehicle 1. A gyro sensor, for example, can be used as the orientation detector 31. The gyro sensor is a sensor which can detect a pitch angle representing a turn in a front-back direction of the amphibious vehicle 1, a roll angle representing a turn in a right-left direction of the amphibious vehicle, and the like. The orientation detector 31 is electrically connected to an input unit of a control device 30. The control device 30 determines a terrain at the bottom on the edge of the water on the basis of a set value as well as orientation data (such as a pitch angle displacement amount) of the amphibious vehicle 1 detected by the orientation detector 31. When the control device 30 determines that the bottom on the edge of the water is composed of a terrain including a terrace, the control device 30 controls the jet direction adjuster 15 in such a way as to locate the jet direction adjuster 15 to a predetermined position. Thus, the jet direction becomes downward behind the amphibious vehicle 1 whereby a force that pushes up the rear part 1b side of the amphibious vehicle 1 is created. As a consequence, the amphibious vehicle 1 can completely climb up the terrace by the rotation of the crawler tracks 22.

In the above-described embodiment, the jet direction adjuster 15 and the like constitute jet direction adjusting means, while the orientation detector 31 and the like constitute orientation detecting means, and the control device 30 and the like constitute controlling means.

Figure 4:
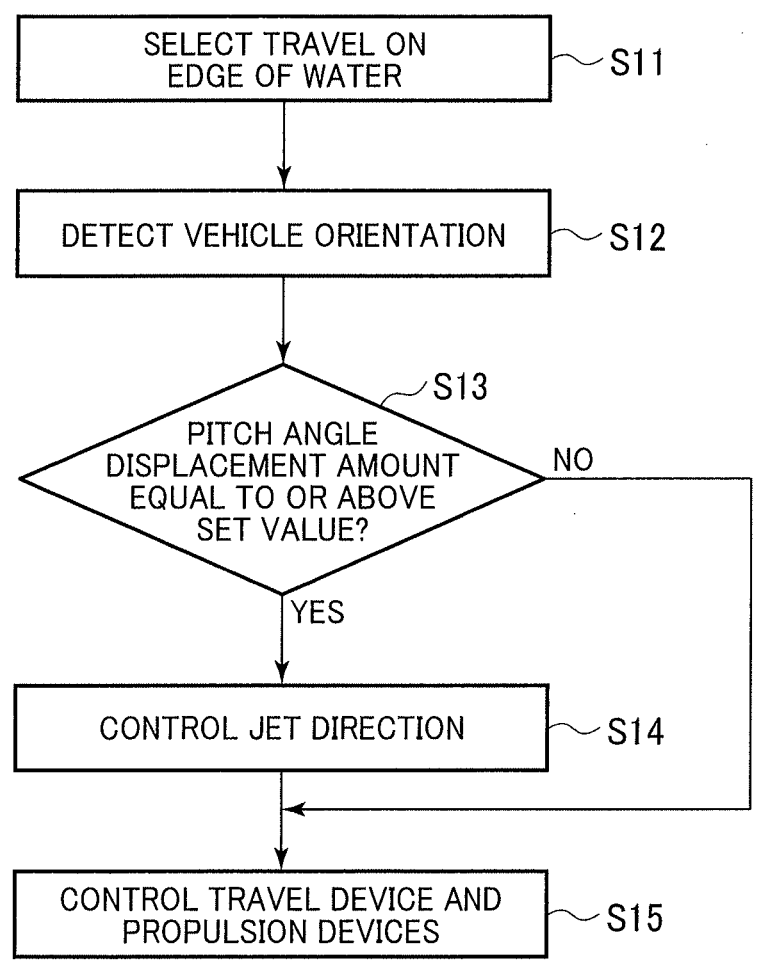
FIG. 4 is a flowchart at the time of travel on edge of water with the vehicle control device for an amphibious vehicle according to a first embodiment of the present invention.
Figure 5:
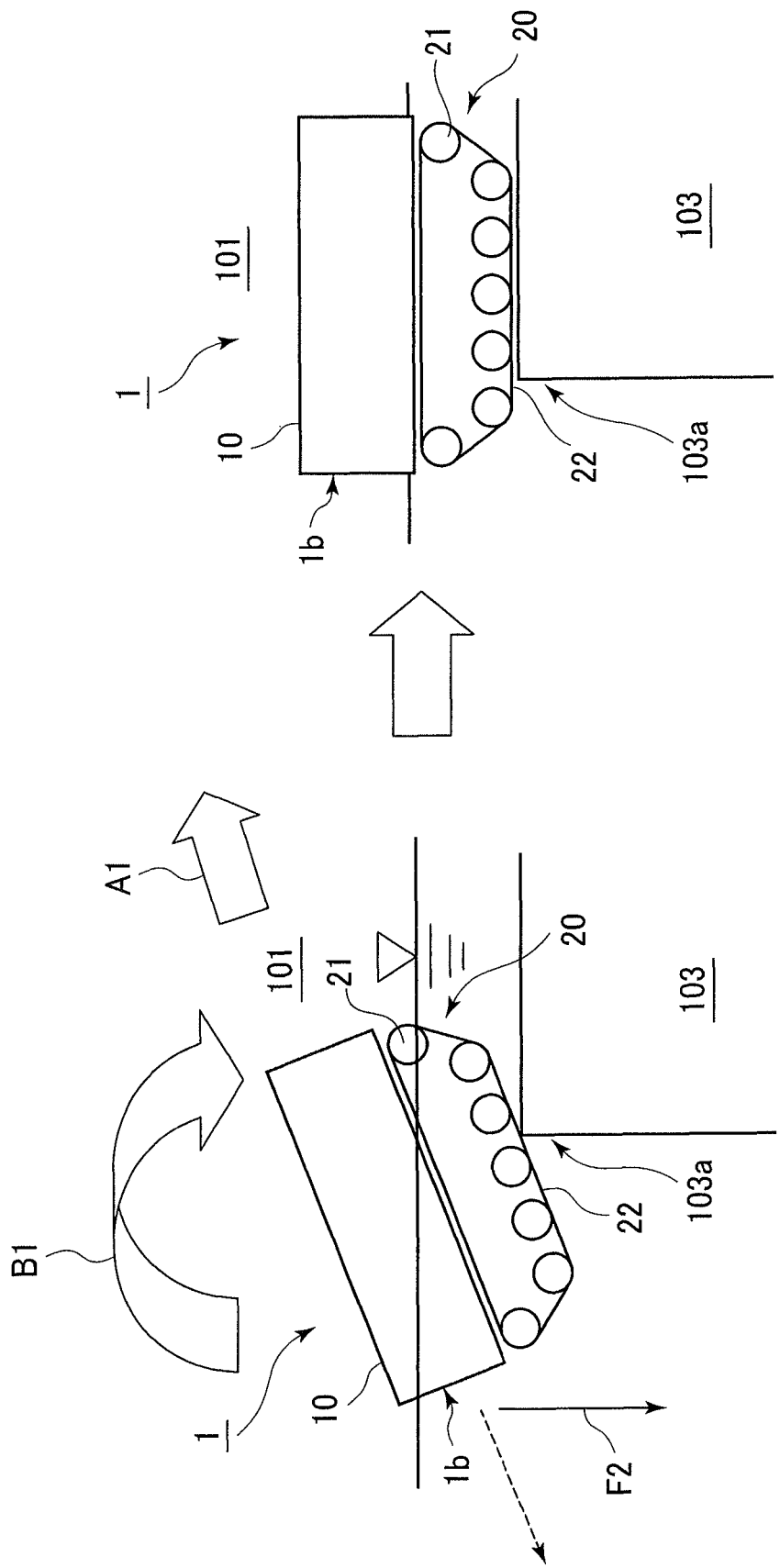
FIG. 5 illustrates explanatory diagrams of the amphibious vehicle equipped with the vehicle control device when the amphibious vehicle travels on an edge of water, which shows a state before the amphibious vehicle completely climbs up a terrace on the edge of the water and a state after the amphibious vehicle has completely climbed up the terrace on the edge of the water.

Next, regarding the amphibious vehicle 1 including the above-described vehicle control device for an amphibious vehicle, motion control of the amphibious vehicle 1 by the vehicle control device when the on-edge-of-water travel mode for traveling on the edge of water is selected will be described on the basis of FIG. 4 and FIG. 5.

When the amphibious vehicle 1 navigating on the water in the on-water navigation mode approaches the edge of the water and the on-edge-of-water travel mode is selected (an on-edge-of-water travel selecting step S11), a pitch angle displacement amount P1 is detected as a vehicle orientation by the orientation detector 31 equipped on the amphibious vehicle 1 (a vehicle orientation detecting step S12).

Subsequently, a determination is made as to whether or not the pitch angle displacement amount P1 detected by the orientation detector 31 is equal to or above a set value P2 of a pitch angle component (a pitch angle displacement amount determining step S13). When the pitch angle displacement amount P1 is determined to be smaller than the set value P2 in the pitch angle displacement amount determining step S13, the travel device 20 and the propulsion devices 11 are controlled without controlling the jet direction adjuster 15, that is, without adjusting (changing) the jet direction by the jet direction adjuster 15 (a drive device-propulsion device controlling step S15). Accordingly, the output from the drive device is transmitted to the sprockets 21, and the crawler tracks 22 are rotated by the rotation of the sprockets 21. Moreover, the output from the drive device is transmitted to the propulsion devices 11 and rotates the propeller shafts 14, and the jets created by the rotation of the propellers 13 are discharged straight backward from the amphibious vehicle 1. Thus, a propulsion force in a forward direction of the amphibious vehicle 1 acts on the amphibious vehicle 1. In other words, the vehicle control device determines that the bottom on the edge of the water is not composed of the terrain including the terrace which requires the propulsion force to push up the rear part 1b side of the amphibious vehicle 1. As a consequence, the amphibious vehicle 1 travels on the edge of the water as in the case where the bottom of the edge of the water is composed of the terrain including the inclined surface extending in the traveling direction of the amphibious vehicle 1.

On the other hand, when the pitch angle displacement amount P1 is determined to be equal to or above the set value P2 of the pitch angle component in the pitch angle displacement amount determining step S13, the jet direction adjuster 15 is adjusted to create the propulsion force to push up the rear part 1b side of the amphibious vehicle 1, for example, by controlling the jet direction adjuster 15 such that the jets from the propulsion devices 11 are directed downward (a jet direction controlling step S14) by locating the jet direction adjuster 15 at the predetermined position. Hence, the travel device 20 and the propulsion devices 11 are controlled in this way (the drive device-propulsion device controlling step S15). Accordingly, the output from the drive device is transmitted to the sprockets 21, and the crawler tracks 22 are rotated by the rotation of the sprockets 21. Moreover, the output from the drive device is transmitted to the propulsion devices 11 and rotates the propeller shafts 14, and the jets created by the rotation of the propellers 13 are discharged downward behind the amphibious vehicle 1. As a consequence, the propulsion force to push up the rear part 1b side of the amphibious vehicle 1 acts on the amphibious vehicle 1 as shown in FIG. 5. In other words, the vehicle control device determines that a bottom 103 on an edge 101 of the water is composed of a terrain including a terrace 103a which the amphibious vehicle 1 cannot completely climb up without the propulsion force that pushes up the rear part 1b side thereof. As a consequence, the amphibious vehicle 1 travels on the terrace 103a on the edge 101 of the water by use of the rotation of the crawler tracks 22 and the downward jets behind the amphibious vehicle 1.

Therefore, according to the vehicle control device for an amphibious vehicle of this embodiment, when the amphibious vehicle 1 travels on the edge of the water, the pitch angle displacement amount of the amphibious vehicle 1 is detected. When the pitch angle displacement amount is determined to be equal to or above the set value of the pitch angle component, the jet direction adjuster 15 is controlled such that the jet created by each propulsion device 11 is directed downward behind the amphibious vehicle 1. Thus, the upward-pushing force acts on the rear part 1b side of the amphibious vehicle 1, and the amphibious vehicle 1 travels in the traveling direction by rotating the crawler tracks 22 by the rotation of the sprockets 21. As a consequence, even when the bottom 103 on the edge 101 of the water is composed of the terrain including the terrace 103a, the amphibious vehicle 1 can travel on the terrace 103a with a stable orientation.

Second Embodiment

A vehicle control device for an amphibious vehicle according to a second embodiment of the present invention will be described on the basis of FIG. 1, FIG. 6, and FIG. 7.

In this embodiment, the vehicle control device for an amphibious vehicle according to the first embodiment described above conducts orientation control on the basis of a roll angle displacement amount instead of conducting the orientation control on the basis of the pitch angle displacement amount. In other words, the vehicle control device for an amphibious vehicle of this embodiment involves a modified control flow to be conducted by the control device included in the vehicle control device for an amphibious vehicle of the first embodiment, and other features are the same as those of the vehicle control device for an amphibious vehicle of the first embodiment.

Note that portions similar to those in the above-described embodiment will be denoted by reference numerals that are similar to those used in the descriptions of the foregoing embodiment, and descriptions overlapping the descriptions in conjunction with the foregoing embodiment will thus be omitted.

Figure 6:
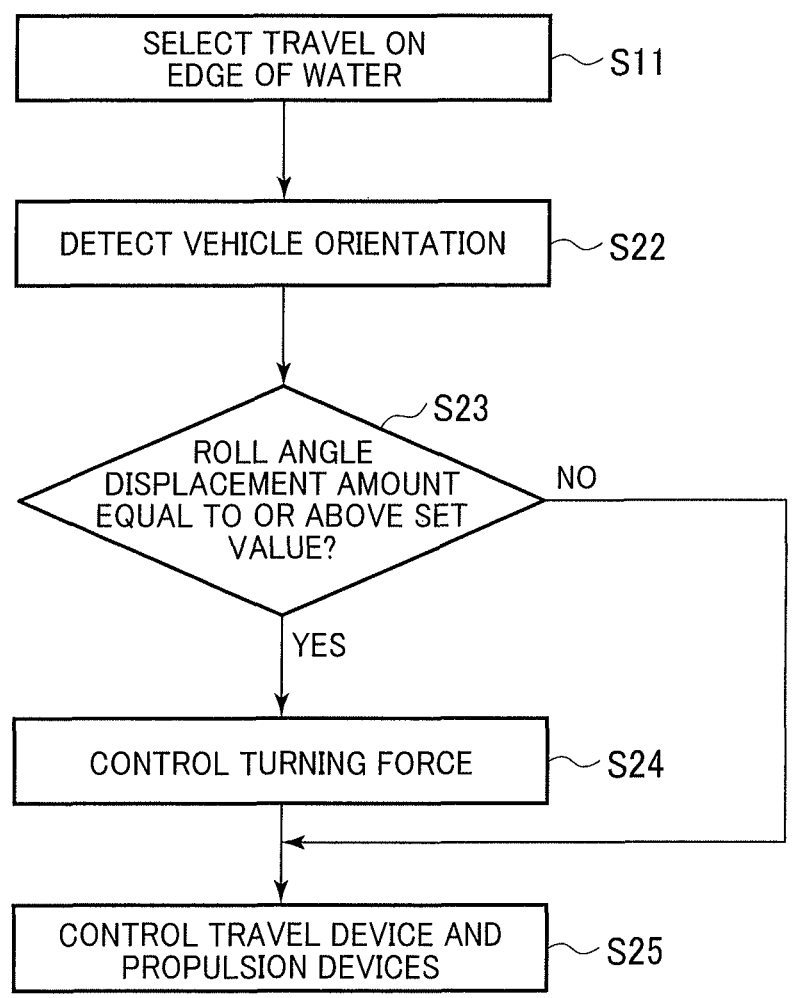
FIG. 6 is a flowchart at the time of travel on edge of water with the vehicle control device for an amphibious vehicle according to a second embodiment of the present invention.
Figure 7:
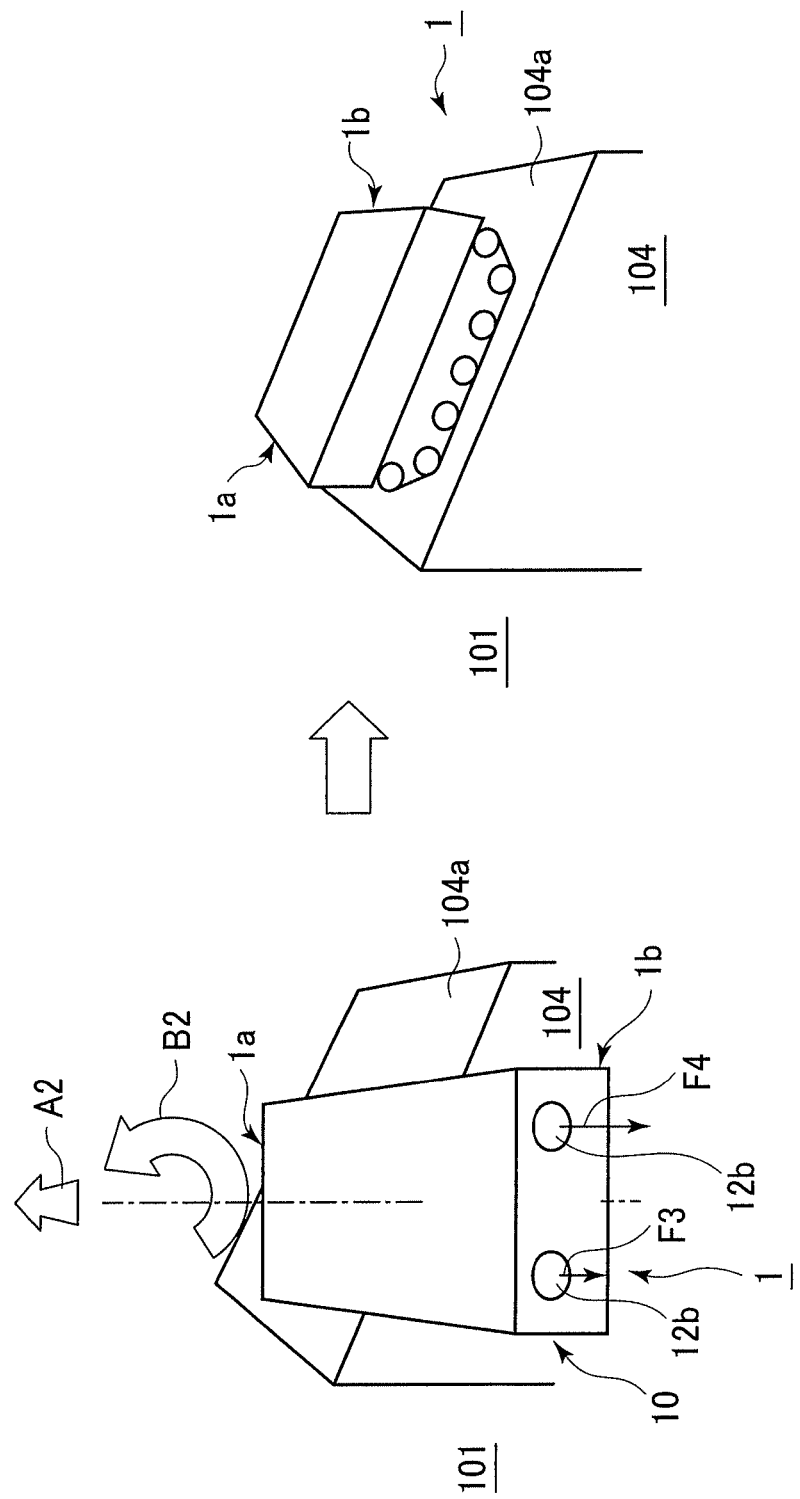
FIG. 7 illustrates explanatory diagrams of the amphibious vehicle equipped with the vehicle control device when the amphibious vehicle travels on an edge of the water, which shows a state before the amphibious vehicle completely climbs up an inclined surface on the edge of the water and a state after the amphibious vehicle has completely climbed up the inclined surface on the edge of the water.
Figure 8:
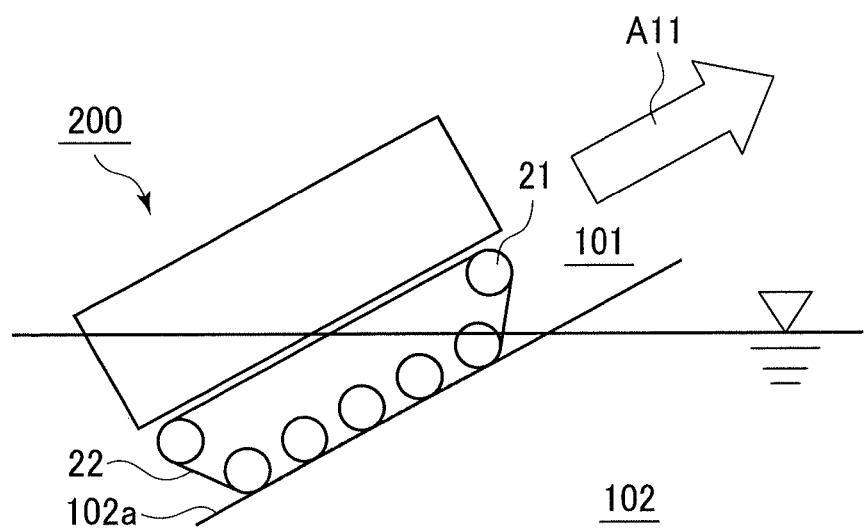
FIG. 8 is an explanatory diagram showing a case where an amphibious vehicle equipped with a conventional vehicle control device travels on a bottom on an edge of water including an inclined surface.
Figure 9A:
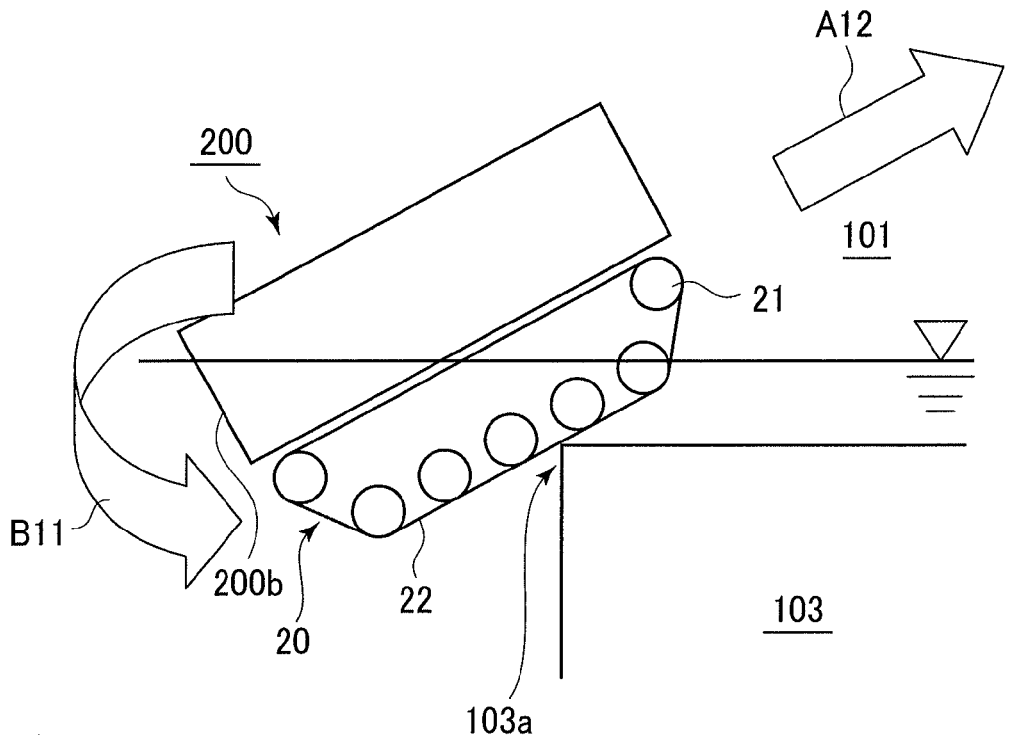
FIG. 9A is an explanatory diagram showing a case where the amphibious vehicle equipped with the conventional vehicle control device travels on a bottom on the edge of the water including a terrace.
Figure 9B:
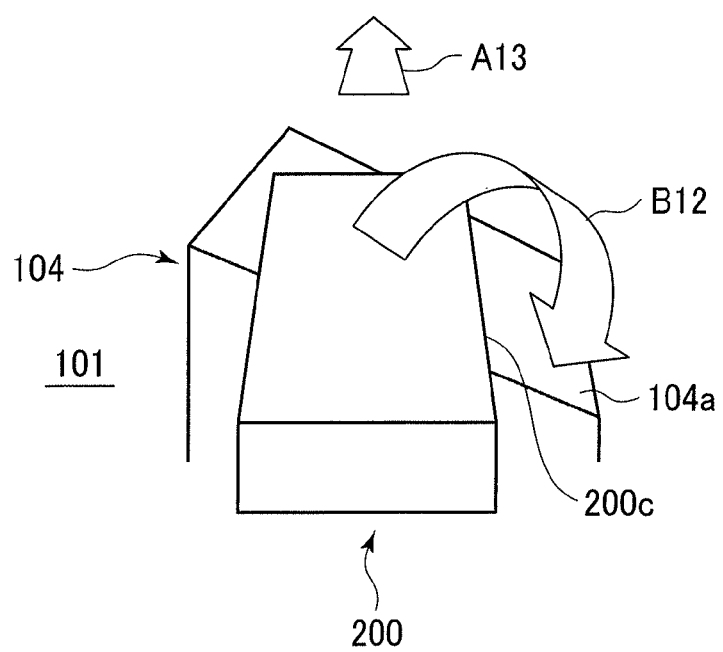
FIG. 9B is an explanatory diagram showing a case where the amphibious vehicle equipped with the conventional vehicle control device travels on a bottom on an edge of the water including an inclined surface extending in a direction different from a traveling direction.

As shown in FIG. 1 and FIG. 6, in the amphibious vehicle 1, the control device 30 determines a terrain at the bottom on the edge of the water on the basis of a set value as well as the orientation data (such as a roll angle displacement amount) of the amphibious vehicle 1 detected by the orientation detector 31. When the control device 30 determines that the bottom on the edge of the water is composed of a terrain including an inclined surface extending in a direction different from the traveling direction, the control device 30 controls the propulsion devices 11 such that a turning force occurs in the amphibious vehicle 1. Thus, the turning force occurs in the amphibious vehicle 1, whereby the amphibious vehicle 1 is turned such that a front side of the amphibious vehicle 1 is directed to an upper part of the inclined surface. Thus, the orientation of the amphibious vehicle 1 is stabilized on the inclined surface. As a consequence, the amphibious vehicle 1 can completely climb up the inclined surface.

Next, regarding the amphibious vehicle 1 including the above-described vehicle control device for an amphibious vehicle, motion control of the amphibious vehicle 1 by the vehicle control device when the on-edge-of-water travel mode for traveling on the edge of water is selected will be described on the basis of FIG. 6 and FIG. 7.

When the amphibious vehicle 1 navigating on the water in the on-water navigation mode approaches the edge of the water and the on-edge-of-water travel mode is selected (the on-edge-of-water travel selecting step S11), a roll angle displacement amount R1 is detected as the vehicle orientation by the orientation detector 31 equipped on the amphibious vehicle 1 (a vehicle orientation detecting step S22).

Subsequently, a determination is made as to whether or not the roll angle displacement amount R1 detected by the orientation detector 31 is equal to or above a set value R2 of a roll angle component (a roll angle displacement amount determining step S23). When the roll angle displacement amount R1 is determined to be smaller than the set value R2 in the roll angle displacement amount determining step S23, the travel device 20 and the propulsion devices 11 are controlled without controlling power distribution between the right and left propulsion devices 11 (a drive device-propulsion device controlling step S25). In other words, in terms of the right and left propulsion devices 11, the power to be distributed to the right and left sides is set equal whereby the output from the drive device is transmitted evenly to the right and left propulsion devices 11. Accordingly, the output from the drive device is transmitted to the sprockets 21, and the crawler tracks 22 are rotated by the rotation of the sprockets 21. Moreover, the output from the drive device is transmitted to the propulsion devices 11 and rotates the propeller shafts 14, and the jets created by the rotation of the propellers 13 are discharged straight backward from the amphibious vehicle 1. Thus, the propulsion force in the forward direction of the amphibious vehicle 1 acts on the amphibious vehicle 1. In other words, the vehicle control device determines that the bottom on the edge of the water is not composed of the terrain including the inclined surface that requires the turning force to turn the rear part 1b side of the amphibious vehicle 1. As a consequence, the amphibious vehicle 1 travels on the edge of the water as in the case where the bottom of the edge of the water is composed of the inclined surface extending in the traveling direction of the amphibious vehicle 1.

On the other hand, when the roll angle displacement amount R1 is determined to be equal to or above the set value R2 of the roll angle component in the roll angle displacement amount determining step S23, the right and left propulsion devices 11 are controlled such that the turning force occurs in the amphibious vehicle 1 (a turning force controlling step S24). Hence, the travel device 20 and the propulsion devices 11 are controlled in this way (the drive device-propulsion device controlling step S25). Accordingly, the output from the drive device is transmitted to the sprockets 21, and the crawler tracks 22 are rotated by the rotation of the sprockets 21. Moreover, as shown in FIG. 7, the output from the drive device is transmitted to the right and left propulsion devices 11 such that the right and left propulsion devices 11 are driven to create jets F3 and F4 on the right and left sides which are different in strength. Thus, the turning force acts on the amphibious vehicle 1. In other words, the vehicle control device determines that a bottom 104 on the edge 101 of the water is composed of a terrain including an inclined surface 104*a* extending in a direction different from the traveling direction, which the amphibious vehicle 1 cannot completely climb up without the turning force that turns the amphibious vehicle 1. As a consequence, the amphibious vehicle 1 travels on the inclined surface 104*a* on the edge 101 of the water by use of the rotation of the crawler tracks 22 and the control of the right and left propulsion devices 11 in such a way as to create the jets having the different strengths between the right and left sides.

Therefore, according to the vehicle control device for an amphibious vehicle of this embodiment, when the amphibious vehicle 1 travels on the edge of the water, the roll angle displacement amount of the amphibious vehicle 1 is detected. When the roll angle displacement amount is determined to be equal to or above the set value of the roll angle component, the right and left propulsion devices 11 are controlled such that the strengths of the jets from the right and left propulsion devices 11 are different between the right and the left. Thus, the turning force acts on the amphibious vehicle 1, and meanwhile, the crawler tracks 22 are rotated by the rotation of the sprockets 21. As a consequence, even when the bottom 104 on the edge 101 of the water is composed of the terrain including the inclined surface 104*a* extending in the direction different from the traveling direction, the amphibious vehicle 1 can travel on the inclined surface 104*a* with a stable orientation.

The vehicle control device for an amphibious vehicle configured to control the jet direction adjuster 15 on the basis of the pitch angle displacement amount detected by the orientation detector 31 and the vehicle control device for an amphibious vehicle configured to control the right and left propulsion devices 11, 11 so as to create the jets having different strengths between the right and left sides on the basis of the roll angle displacement amount detected by the orientation detector 31 have been described above. However, it is also possible to provide a vehicle control device for an amphibious vehicle including: the orientation detector 31 configured to detect both the roll angle displacement amount of the amphibious vehicle 1 and the pitch angle displacement amount of the amphibious vehicle 1; and the control device configured, when the on-edge-of-water traveling mode is selected, to control the jet direction adjuster 15 such that the discharging direction of the jets created by the propulsion devices 11 are directed downward behind the amphibious vehicle 1 if the pitch angle displacement amount detected by the orientation detector 31 is determined to be equal to or above the set value of the pitch angle component, and to control the right and left propulsion devices 11, 11 such that the turning force occurs in the amphibious vehicle 1 by creating the jets having different strengths between the right and left sides if the roll angle displacement amount detected by the orientation detector 31 is determined to be equal to or above the set value of the roll angle component. As with the vehicle control devices for an amphibious vehicle according to the above-described first and second embodiments, this vehicle control device can stabilize the orientation of the amphibious vehicle on the edge of the water even when the edge of the water is composed of a terrain including a terrace or a terrain including an inclined surface in a direction different from the traveling direction of the amphibious vehicle.

The vehicle control device for an amphibious vehicle including the propulsion devices 11 capable of discharging the jets from two positions on the right and left sides at the rear part of the amphibious vehicle has been described above. However, it is also possible to provide a vehicle control device for an amphibious vehicle including propulsion devices capable of discharging jets from three or more positions on the right and left sides at the rear part of the amphibious vehicle. Meanwhile, it is also possible to provide a vehicle control device for an amphibious vehicle including a propulsion device capable of discharging a jet from one position in the right-left direction at the rear part of the amphibious vehicle, and a jet direction adjuster capable of adjusting the jet in a turning direction such that the turning force occurs in the amphibious vehicle. These cases also have the operation and effect similar to those of the above-described vehicle control devices for an amphibious device.

INDUSTRIAL APPLICABILITY

A vehicle control device for an amphibious vehicle according to the present invention allows an amphibious vehicle to travel with a stable orientation even when a bottom on an edge of water is composed of a terrain including a terrace or a terrain including an inclined surface extending in a direction different from a traveling direction. As a consequence, the vehicle control device for an amphibious vehicle can expand a range of terrains on which the amphibious vehicle can travel, and is therefore extremely useful.

EXPLANATION OF REFERENCE NUMERALS

1 amphibious vehicle
10 vehicle body
11 propulsion device
12 fluid passage
13 propeller
14 propeller shaft
15 jet direction adjuster
20 travel device
21 sprocket (drive wheel)
22 crawler track
30 control device
31 orientation detector
101 edge of water
102 bottom of water
102*a* inclined surface
103 bottom of water
103*a* terrace
104 bottom of water
104*a* inclined surface
A1, A2 traveling direction
B2 turning direction
F1 jet direction (backward)
F2 jet direction (downward)
S11 on-edge-of-water travel selecting step
S12 vehicle orientation detecting step
S13 pitch angle displacement amount determining step
S14 jet direction controlling step
S15 drive device-propulsion device controlling step
S22 vehicle orientation detecting step
S23 roll angle displacement amount determining step
S24 turning force controlling step
S25 drive device-propulsion device controlling step

The invention claimed is:
1. A vehicle control device for an amphibious vehicle, the amphibious vehicle comprising:
   a drive device;
   crawler tracks;
   a propulsion device;
   wherein
   the drive device transmits an output to the crawler tracks to perform on-land travel when an on-land travel mode is selected, the drive device transmits an output to the propulsion device that creates a jet for navigating on top of water when an on-water navigation mode is selected, the drive device transmits an output to the crawler tracks and the propulsion device for traveling on an edge of the water when an on-edge-of-water travel mode is selected, the vehicle control device for said amphibious vehicle comprising:

jet direction adjusting means for adjusting a discharging direction of the jet created by the propulsion device;

orientation detecting means for detecting an orientation of the amphibious vehicle; and controlling means for controlling at least one of the jet direction adjusting means and the propulsion device on the basis of the orientation of the amphibious vehicle detected by the orientation detecting means such that the jet from the propulsion device is directed downward behind the amphibious vehicle or that a turning force occurs in the amphibious vehicle, when the on-edge-of-water travel mode is selected.

2. The vehicle control device for an amphibious vehicle according to claim 1, characterized in that the orientation detecting means is capable of detecting a pitch angle displacement amount of the amphibious vehicle, and the controlling means controls the jet direction adjusting means such that the discharging direction of the jet created by the propulsion device is directed downward behind the amphibious vehicle when the pitch angle displacement amount detected by the orientation detecting means is equal to or above a set value of a pitch angle component.

3. The vehicle control device for an amphibious vehicle according to claim 1, characterized in that the orientation detecting means is capable of detecting a roll angle displacement amount of the amphibious vehicle, the propulsion device is an instrument capable of discharging the jet created by the propulsion device from one position at a rear part of the amphibious vehicle, and the controlling means controls the jet direction adjusting means such that a turning force occurs in the amphibious vehicle when the roll angle displacement amount detected by the orientation detecting means is equal to or above a set value of a roll angle component.

4. The vehicle control device for an amphibious vehicle according to claim 1, characterized in that the orientation detecting means is capable of detecting a roll angle displacement amount of the amphibious vehicle, the propulsion device is an instrument capable of discharging the jet created by the propulsion device from at least two positions in a right-left direction at a rear part of the amphibious vehicle, and the controlling means controls the propulsion device such that a turning force occurs in the amphibious vehicle when the roll angle displacement amount detected by the orientation detecting means is equal to or above a set value of a roll angle component.

5. The vehicle control device for an amphibious vehicle according to claim 1, characterized in that the orientation detecting means is capable of detecting a pitch angle displacement amount of the amphibious vehicle and a roll angle displacement amount of the amphibious vehicle, the propulsion device is an instrument capable of discharging the jet created by the propulsion device from one position at a rear part of the amphibious vehicle, and the controlling means controls the jet direction adjusting means such that the discharging direction of the jet created by the propulsion device is directed downward behind the amphibious vehicle when the pitch angle displacement amount detected by the orientation detecting means is equal to or above a set value of a pitch angle component, and controls the jet direction adjusting means such that a turning force occurs in the amphibious vehicle when the roll angle displacement amount detected by the orientation detecting means is equal to or above a set value of a roll angle component.

6. The vehicle control device for an amphibious vehicle according to claim 1, characterized in that the orientation detecting means is capable of detecting a pitch angle displacement amount of the amphibious vehicle and a roll angle displacement amount of the amphibious vehicle, the propulsion device is an instrument capable of discharging the jet created by the propulsion device from at least two positions in a right-left direction at a rear part of the amphibious vehicle, and the controlling means controls the jet direction adjusting means such that the discharging direction of the jet created by the propulsion device is directed downward behind the amphibious vehicle when the pitch angle displacement amount detected by the orientation detecting means is equal to or above a set value of a pitch angle component, and controls the propulsion device such that a turning force occurs in the amphibious vehicle when the roll angle displacement amount detected by the orientation detecting means is equal to or above a set value of a roll angle component.

\* \* \* \* \*